United States Patent Office 3,441,629
Patented Apr. 29, 1969

3,441,629
ISOMERIZATION OF ACYCLIC TRIENE
COMPOUNDS
Ernest A. Zuech, Bartlesville, Okla., assignor to Phillips
Petroleum Company, a corporation of Delaware
No Drawing. Filed June 27, 1966, Ser. No. 560,822
Int. Cl. C07c 5/24
U.S. Cl. 260—683.2
10 Claims

ABSTRACT OF THE DISCLOSURE

Acyclic unbranched 1,3,6-triene compounds containing 8–12 carbon atoms per molecule are isomerized to the corresponding 2,4,6-triene by contact with potassium amide as an isomerization catalyst.

---

This invention relates to the isomerization of acyclic triene compounds. In one aspect, this invention relates to the isomerization of unconjugated acyclic triene compounds to conjugated acyclic triene compounds. In another aspect, this invention relates to isomerization catalyst systems for isomerizing acyclic triene compounds. In still another aspect, this invention relates to processes for separating mixtures of isomeric acyclic triene compounds.

The utility of conjugated acyclic triene compounds in the polymerization field to form homopolymers and copolymers with other monomers has increased the demand for these compounds. This has prompted the search for ways in which conjugated acyclic triene compounds can be produced. These compounds also find utility as starting materials for the preparation of more complex organic compounds.

According to this invention, an acyclic unbranched 1,3,6-triene compound containing 8 to 12 carbon atoms per molecule, inclusive, is isomerized to an acyclic unbranched 2,4,6-triene compound having the same number of carbon atoms per molecule as the 1,3,6-triene compound. This is accomplished by contacting the 1,3,6-triene compound under isomerizing conditions in an isomerization zone with a potassium amide isomerization catalyst which is capable of effecting the isomerization reaction. The conjugated acyclic 2,4,6-triene compound thus formed is then recovered from the reaction mixture. The term potassium amide as used herein is intended to include substituted potassium amide catalysts.

In one specific embodiment of the invention, a mixture of triene isomers such as one containing 1,3,6-triene and 1,3,7-triene compounds can be contacted with the potassium amide or substituted potassium amide isomerization catalyst under isomerizing conditions. This will result in the isomerization of the 1,3,6-triene compound to the corresponding 2,4,6-triene compound with substantially no change occuring in the 1,3,7-triene compound. The 2,4,6-triene isomer can then be easily separated from the total mixture and specifically from the 1,3,7-triene compound by distillation or the like. It can thus be seen that this embodiment of the invention provides a novel and efficient method for transforming a mixture of triene compounds into a mixture, the components of which can be easily separated.

Accordingly, it is an object of this invention to isomerize acyclic triene compounds. Another object of this invention is to provide a process for separating mixtures of triene isomer compounds. A further object of this invention is to provide a novel potassium amide or substituted potassium amide isomerization catalyst. These and other objects of the invention will become apparent to one skilled in the art after studying the following detailed description and the appended claims.

In the practice of this invention, acyclic unbranched 1,3,6-triene compounds containing 8 to 12 carbon atoms per molecule are isomerized to acyclic 2,4,6-triene compounds which have the same number of carbon atoms per molecule as the 1,3,6-triene compound starting material. This is accomplished by contacting the 1,3,6-triene compounds under isomerizing conditions in an isomerization zone with a potassium amide or substituted potassium amide isomerization catalyst capable of effecting the isomerization reaction. Thus, the acyclic 1,3,6-triene compounds which can be isomerized to acyclic 2,4,6-triene compounds include 1,3,6-octatriene; 1,3,6-nonatriene; 1,3,6-decatriene; 1,3,6-undecatriene; and 1,3,6-dodecatriene. The isomerization reaction of this invention can be used to produce the corresponding conjugated 2,4,6-triene compound from each of the 1,3,6-triene isomers.

Any suitable potassium amide or substituted potassium amide catalyst which is capable of effecting the isomerization reaction to promote formation of the 2,4,6-triene isomers can be used in the practice of this invention. Specific isomerization catalysts which can be used in the practice of the invention are represented by the structural formula

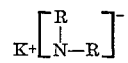

wherein each R can be the same or different and is selected from the group consisting of a hydrogen atom and alkyl, aralkyl, cycloalkyl, alkylcycloalkyl, and cycloalkylalkyl radicals containing 1 to 10 carbon atoms and alkylene radicals which together with the nitrogen atom can form a 5 to 7 membered heterocyclic ring. Specific isomerization catalysts which can be used in the practice of this invention and which are within the scope of the above structural formula include potassium amide, dimethylaminopotassium, di-n-hexylaminopotassium, di-n-decylaminopotassium, di(4 - phenylbutyl)aminopotassium, di(2 - methylcyclohexyl)aminopotassium, N - amyl-tert-butylaminopotassium, piperidinopotassium, cyclohexylethylaminopotassium, 2-butylpiperidinopotassium, benzylaminopotassium, cyclohexylaminopotassium, and N-ethylcyclohexylaminopotassium.

The isomerization catalyst of this invention can be prepared by any suitable technique such as by directly reacting potassium with ammonia or a suitable primary or secondary amine under conditions which will promote formation of the corresponding potassium amide or substituted potassium amide. Any of the suitable catalyst preparation methods known to those skilled in the art can be used. For example, diethylaminopotassium can be prepared by contacting metallic potassium with diethylamine in n-heptane at a temperature within the range of about 30 to about 115° C. for a period of time sufficient to obtain a reaction between the potassium and the amine.

In the practice of the invention, the concentration of the potassium amide catalyst can be within a broad range. It is generally preferred to conduct the process with the mole ratio of the potassium-containing catalyst to the 1,3,6-triene compound in the range of about 0.001:1 to about 1:1. Concentrations outside of this range can be employed if desired.

The isomerization reaction of this invention can be carried out in the presence of a solvent which is normally liquid at ambient temperature and at substantially atmospheric pressure. Solvents which can be used include amines, saturated cyclic and acyclic hydrocarbons, and aromatic hydrocarbons. Exemplary amines which can be used for this purpose include ammonia, methylamine, diethylamine, tri-n-butylamine, N-methyl - N - ethyloctylamine, di-n-propylamine, n-hexylamine, n-decylamine, tertoctylamine, piperidine, morpholine, N,N-dimethylaniline, N-methylpiperidine, and the like. Examples of saturated cyclic and acyclic hydrocarbons and aromatic hydrocarbons which can be used as a solvent for the reactants of the invention include n-pentane, n-hexane, cyclohexane, heptane, decane, n-dodecane, benzene, toluene, isooctane, butylcyclohexane, and the like.

The isomerization reaction of the invention is generally carried out at a temperature within the range of about 10 to about 350° C. for a period of from a few seconds, such as one second, to several hours, such as 48 hours, preferably for a period of time within the range of about 10 minutes to about 24 hours. The actual reaction time employed will be governed by such factors as catalyst concentration, catalyst activity, and reaction temperature. The reaction is conducted under liquid phase conditions at substantially atmospheric pressure. Superatmospheric pressures can be used if desired to maintain the liquid phase condition.

The 2,4,6-triene compounds formed in the practice of this invention have utility for producing homopolymers and copolymers with other unsaturated organic compounds. These polymers can be formed into useful products such as, for example, sheets, films, and the like. The products produced by the process of this invention can also be employed as chemical intermediates in the preparation of more complex organic compounds.

The following examples will further illustrate the invention. It must be understood that these examples are for this purpose only and must not be considered limiting of the invention.

EXAMPLE I

A three-necked flask equipped with a stirrer, condenser, thermometer, and dropping funnel was charged with 0.75 gram (0.0065 mole) of phenylpotassium suspended in 5 milliliters of toluene. The flask was then charged with 4.3 grams (0.05 mole) of piperidine which reacted with the phenylpotassium to form the piperidinopotassium catalyst. After a few minutes a mixture of acyclic isomeric octatrienes was added dropwise to the flask. This feed mixture was analyzed by GLC (gas-liquid chromatography) on a 10-foot silicone oil column and found to contain 31.9 weight percent 1,3,7-octatriene, 65.3 weight percent 1,3,6-octatriene, 1.7 weight percent vinylcyclohexene, and 1.1 weight percent of unknowns. This corresponds to 12.1 grams (0.11 mole) of the 1,3,6-octatriene isomer in the mixture. The mole ratio of the piperidino-potassium catalyst to the 1,3,6-octatriene was 0.059 to 1. During the addition of the mixture of octatrienes, the flask was immersed in a water bath and maintained at a temperature of about 20° C. At the conclusion of the addition of the mixture, the ingredients were allowed to stand for two hours. The mixture was then heated to a temperature of about 100 to 103° C. and held for about three hours. At the end of this time the reaction mixture was hydrolyzed and the organic layer removed and distilled. Analysis of the reaction product revealed 35.2 weight percent 1,3,7-octatriene, 61.2 weight percent 2,4,6-octatriene, and 3.6 weight percent of unknown materials. These data show that the 1,3,6-octatriene isomer was converted nearly quantitatively to the 2,4,6-octatriene isomer whereas the 1,3,7-octatriene isomer was not affected by the piperidinopotassium catalyst. Further analysis of the 2,4,6-octatriene showed that it was 72 percent all trans; 25 percent cis, trans, trans; and 3 percent cis, cis, trans.

EXAMPLE II

The equipment and technique of Example I was repeated using 32.5 grams of an isomeric octatriene mixture which contained 48.7 weight percent 1,3,7-octatriene; 49.1 weight percent 1,3,6-octatriene (0.148 mole) and 2.2 weight percent vinylcyclohexene. The mixture was added to the flask containing the piperidinopotassium catalyst in an amount to provide a mole ratio of catalyst to 1,3,6-octatriene of 0.044 to 1. The mixture was allowed to stand at room temperature for two hours at the conclusion of which heat was applied to raise the temperature of the mixture to 98° C. for 2½ hours. The reaction mixture was hydrolyzed, washed with water, and the organic layer removed and dried over calcium sulfate. A GLC analysis showed that the reaction product comprised 48.3 weight percent 1,3,7-octatriene; 46.3 weight percent 2,4,6-octatriene; 3.2 weight percent vinylcyclohexene; and 2.1 weight percent unknown. The 2,4,6-octatriene had an isomer ratio of all trans; cis, trans, trans; cis, cis, trans; equal to 66:31:3. The dried organic product was distilled and fractions collected between 65–69° C. (100 millimeters), 69–88° C. (100 millimeters), 88–90° C. (100 millimeters, 84° at 80 millimeters). The presence of the 1,3,7-octatriene in the fraction collected between 65–69° C. was confirmed by infrared examination. The fraction collected between 88–90° C. was dissolved in methanol and the resulting solution filtered. This step was repeated several times during which a few drops of water were added periodically to induce crystallization. The white solid which formed sublimed at 2 millimeters of pressure at room temperature using a solid $CO_2$-acetone condenser. The melting point of the sublimed material was found to be between 50 and 52° C. The melting point of all trans 2,4,6-octatriene is reported in the literature to be 50° C.

EXAMPLE III

In another run, 1 gram of phenylpotassium (0.0086 mole) in 10 milliliters of heptane was charged to the three-necked flask. This was followed by 4.3 grams of piperidine being charged to the flask. After stirring for 15 minutes to promote the formation of the piperidinopotassium catalyst, 75.5 grams of a mixture of octatrienes were added dropwise. The starting mixture was analyzed and found to consist of 71.2 weight percent 1,3,7-octatriene, 26.5 weight percent 1,3,6-octatriene (0.185 mole), and 2.3 weight percent vinylcyclohexene. This corresponds to a catalyst to 1,3,6-octatriene mole ratio of 0.046 to 1. The mixture in the flask was heated to a temperature of about 100° C. which was maintained for about 1 hour. At the conclusion of this time the reaction product was hydrolyzed, washed with water, and the organic layer separated and dried by the same technique used in Example II. The organic phase was analyzed and found to consist of 70.8 weight percent 1,3,7-octatriene, 25.7 weight percent 2,4,6-octatriene; 2.2 weight percent vinylcyclohexene; and 1.2 weight percent unknown. Distillation of this phase recovered 52.2 grams of 1,3,7-octatriene and 18.9 grams 2,4,6-octatriene. The starting material contained 53.8 grams of the 1,3,7-isomer and 20.0 grams of the 1,3,6-isomer. These data show that there is a substantial total conversion of the 1,3,6-isomer to the 2,4,6-isomer whereas the 1,3,7-isomer remains substantially unchanged.

EXAMPLE IV

In another run, 1 gram of phenylpotassium (0.0086 mole) in 10 milliliters of heptane was charged to the reaction flask. The reaction flask was then charged with 5 milliliters of diethylamine and the reaction allowed to proceed at room temperature for about one hour. This resulted in the formation of diethylaminopotassium catalyst. The reaction flask was then charged with 15.4 grams of a mixture of isomeric octatrienes by dropwise addition over a period of 12 minutes. This mixture consisted of 27 weight percent 1,3,7-octatriene; 70.3 weight percent 1,3,6-octatriene (0.1 mole); and 2.7 weight percent vinylcyclohexene. This corresponds to a catalyst to 1,3,6-octatriene mole ratio of 0.086 to 1. The reaction was allowed to continue to substantial completion whereupon it was hydrolyzed, washed with water, and the organic layer separated and dried. The organic layer was analyzed by GLC and found to consist of 24.3 weight percent 1,3,7-octatriene; 69.2 weight percent 2,4,6-octatriene; and 6.4 weight percent unknown. These data show that the potassium catalyst effectively isomerized the 1,3,6-octatriene to 2,4,6-octatriene. The data also show that the catalyst did not affect the 1,3,7-octatriene isomer.

EXAMPLE V

In another run, 1 gram of phenylpotassium (0.0086 mole) and 10 milliliters of heptane were charged to the reaction flask. This was followed by the addition of 4 grams of 1,1,3,3-tetramethylbutylamine. The reactants were stirred for 45 minutes at room temperature to promote formation of 1,1,3,3-tetramethylbutylaminopotassium. The total of 19.3 grams of a mixture of isomeric octatrienes was then added dropwise to the reaction flask. This mixture was analyzed and found to consist of 13.3 weight percent 1,3,7-octatriene; 85.3 (0.152 mole) weight percent 1,3,6-octatriene; and 1.4 weight percent vinylcyclohexene. This corresponds to a catalyst to 1,3,6-octatriene mole ratio of 0.056 to 1. The reaction was allowed to proceed to substantial completion and the reaction mixture hydrolyzed, washed with water, and the organic layer separated and dried. The organic phase was analyzed by GLC and found to consist of 13.6 weight percent 1,3,7-octatriene; 80.7 weight percent 2,4,6-octatriene; and 5.7 weight percent unknown. These data show that potassium 1,1,3,3-tetramethylbutylamide is an effective catalyst for isomerizing 1,3,6-octatriene to its 2,4,6-octatriene isomer. The data also show that this potassium amide catalyst does not affect the 1,3,7-octatriene isomer.

While the isomerization process of this invention has been described in connection with a batch operation for illustrative purposes, it will be apparent to those skilled in the art that a continuous system can be used without departing from the spirit of this invention.

Although the invention has been described in considerable detail, it must be understood that such description is for the purpose of illustration only and must not be considered limiting of the invention.

I claim:

1. A process of isomerizing an acyclic unbranched 1,3,6-triene compound containing 8 to 12 carbon atoms per molecule, inclusive, to an acyclic unbranched 2,4,6-triene compound having the same number of carbon atoms per molecule as the 1,3,6-triene compound comprising contacting the 1,3,6-triene compound under isomerizing conditions in an isomerization zone with a potassium amide isomerization catalyst capable of effecting said isomerization; and recovering the 2,4,6-triene compound thus formed wherein the potassium amide isomerization catalyst is selected from the group of catalysts represented by the structural formula

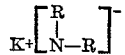

wherein each R can be the same or different and is selected from the group consisting of a hydrogen atom and alkyl, aralkyl, cycloalkyl, alkylcycloalkyl, and cycloalkylalkyl radicals containing 1 to 10 carbon atoms and which together with the nitrogen atom can form a heterocyclic ring.

2. A process according to claim 1 wherein the 1,3,6-triene compound is present in a mixture of other triene compounds including 1,3,7-octatriene.

3. A process according to claim 1 wherein the 1,3,6-triene compound is 1,3,6-octatriene and the 2,4,6-triene compound formed is 2,4,6-octatriene.

4. A process according to claim 1 wherein the isomerization is effected in the presence of a solvent which is normally liquid at ambient temperature and at substantially atmospheric pressure and is selected from the group consisting of amines, saturated cyclic and acyclic hydrocarbons, and aromatic hydrocarbons.

5. A process according to claim 1 wherein the 1,3,6-triene compound is contacted with the potassium amide isomerization catalyst at a temperature within the range of about 10 to about 350° C. for a period of time within the range of about 1 second to about 48 hours.

6. A process according to claim 1 wherein the mole ratio of the potassium amide catalyst to the 1,3,6-triene compound is within the range of about 0.001:1 to about 1:1.

7. A process according to claim 1 wherein the potassium amide catalyst is piperidinopotassium.

8. A process according to claim 1 wherein the potassium amide catalyst is diethylaminopotassium.

9. A process according to claim 1 wherein the potassium amide catalyst is 1,1,3,3-tetramethylbutylaminopotassium.

10. A process according to claim 1 wherein the 1,3,6-triene compound is 1,3,6-octatriene and the 2,4,6-triene compound formed is 2,4,6-octatriene and the 1,3,6-octatriene is contacted with the potassium amide isomerization catalyst at a atemperature within the range of about 10–350° C. for a period of time within a range of about 1 second to about 48 hours.

References Cited

UNITED STATES PATENTS 3,379,781  4/1968  Zeuch et al. _____ 260—666
3,201,493  8/1965  Meisinger _____ 260—683.2

PAUL M. COUGHLAN, JR., Primary Examiner.

J. D. MYERS, Assistant Examiner.

U.S. Cl. X.R.

260—677